(12) United States Patent
Harmon et al.

(10) Patent No.: US 8,886,361 B1
(45) Date of Patent: Nov. 11, 2014

(54) ENERGY DECISION MANAGEMENT SYSTEM

(75) Inventors: Ed Harmon, Atlanta, GA (US); Ted Gaillard, Atlanta, GA (US)

(73) Assignee: The Southern Company, Atlanta, GA (US)

( * ) Notice: Subject to any disclaimer, the term of this patent is extended or adjusted under 35 U.S.C. 154(b) by 362 days.

(21) Appl. No.: 12/819,792

(22) Filed: Jun. 21, 2010

Related U.S. Application Data

(60) Provisional application No. 61/219,029, filed on Jun. 22, 2009.

(51) Int. Cl.
G05D 3/12 (2006.01)

(52) U.S. Cl.
USPC .......................................... 700/291; 700/296

(58) Field of Classification Search
USPC ................. 700/275–276, 286, 297, 295–296; 702/182, 188; 705/7.12
See application file for complete search history.

(56) References Cited

U.S. PATENT DOCUMENTS

| | | | | |
|---|---|---|---|---|
| 3,932,735 | A * | 1/1976 | Giras | 700/287 |
| 5,233,538 | A * | 8/1993 | Wallis | 702/62 |
| 2004/0039622 | A1* | 2/2004 | Masiello et al. | 705/8 |
| 2004/0044442 | A1* | 3/2004 | Bayoumi et al. | 700/286 |
| 2004/0133314 | A1* | 7/2004 | Ehlers et al. | 700/276 |
| 2007/0203860 | A1* | 8/2007 | Golden et al. | 705/412 |
| 2007/0271006 | A1* | 11/2007 | Golden et al. | 700/295 |
| 2008/0114499 | A1* | 5/2008 | Hakim et al. | 700/291 |
| 2009/0012653 | A1* | 1/2009 | Cheng et al. | 700/287 |

* cited by examiner

*Primary Examiner* — Sean Shechtman
(74) *Attorney, Agent, or Firm* — Troutman Sanders LLP; Ryan A. Schneider; Dustin B. Weeks

(57) ABSTRACT

An energy decision management system manages, controls, or manipulates data to monitor, measure, or control one or more energy systems. The EDMS includes at least three modules or systems working together to manage the information needed for a user to render decisions as to which energy system to operate, in which the desire is to minimize costs. The EDMS includes a budget/forecast module, a scheduling module, and a performance module. The budget module creates a strategic energy decision plan to run various energy systems. The scheduling module creates an operational schedule to determine which energy system is best to operate based on predetermined criteria. The performance module produces management reports to quantify operational issues and successes.

12 Claims, 11 Drawing Sheets

ENERGY DECISION MANAGEMENT SYSTEM

CROSS-REFERENCE TO RELATED APPLICATIONS

This application claims the benefit, under 35 U.S.C. §119(e), of U.S. Provisional Patent Application No. 61/219,029, filed 22 Jun. 2009, entitled "Energy Decision Management System," the entire contents and substance of which is incorporated herein by reference in its entirety as if fully set forth below.

BACKGROUND

Embodiments of the present invention relate to an energy decision management system and, more particularly, to a decision making system that manages, controls, or manipulates data to monitor, measure, or control an energy system.

An industrial plant is a very complicated system that may include a plurality of energy systems, including, for example, machines, devices, or equipment controlled by electric, natural gas, and the like. One goal of operating such an industrial plant is to attain the maximum cost efficiency, or the lowest cost, in terms of the cost of operating the plant. In order to operate at maximum efficiency, each of the energy systems of the power plant must be optimized in its operational characteristics.

The optimization of the energy system is a continuous process, because the operating characteristics of the various energy systems change with time. Additionally, it is necessary from time to time to take one or more components out of service, without interrupting operation of the plant, for example, for routine maintenance. Not only do the operating characteristics of the various energy systems change with time, but the energy cost associated with operating each energy system also changes with time. For example, during the winter months when the cost of heating oil typically increases it becomes more expensive to operate some energy systems. In addition, fluctuations in the cost of electricity may impact the operating cost of other energy systems.

SUMMARY

Briefly described, embodiments of the present invention relate to an energy decision management system for managing, controlling, or manipulating data to monitor, measure, or control one or more energy systems. The energy decision management system is adapted to indicate which of a plurality of energy systems should be operated in which to maximize cost savings.

Exemplarily, the energy decision management system ("EDMS") is a decision making tool that may be added to an existing energy management system, distributed control system, distributed data control system or other types of systems that manage, control, or manipulate data to monitor, measure, or control a plurality of energy systems. For example, the EDMS may relate to a decision making system utilizing a modular approach by gathering data in real time and rendering decisions based on fuels, environmental impacts, societal impacts, and other factors. Each module of the EDMS works along side other modules that budget, schedule, or guide operations that affect performance.

In an exemplary embodiment, the EDMS includes at least three modules or systems working together to manage the information needed for a user or automated system to render decisions as to which energy system to operate, in which a desire is to minimize costs. The EDMS includes a budget/forecast module, a scheduling module, and a performance module. The budget module creates a strategic energy decision plan to run various energy systems. The scheduling module creates an operational schedule to determine the energy system that is best to operate based on predetermined criteria. The performance module produces management reports to quantify operational issues and successes.

The budget module can receive and use an energy profile, energy costs (e.g., fuel oil, natural gas, electric, wood waste, coal, hybrid fuel, and the like), plant operating characteristics, bench marks, base load characteristics, plant usage forecasts, historical usage, and the like. This information can be handled in various time formats (e.g., hourly, daily, weekly, monthly and annual). For example, the budget module can generate a 12 month forecast of projected energy prices, load shape, energy credits, trends, hourly, switching scenarios, run time, and gas displacement for carbon credits for communicating with the scheduling module.

The scheduling module produces an operating schedule for the plant personnel or automated system to monitor and maintain the operations of the energy system(s). As noted, the budget module can produce a forecast that is measured by the actual energy needs and costs, which can be updated daily. The scheduling module produces a running schedule based on projected energy prices, e.g., received from the budget module, environmental issues/concerns, environmental credits, renewable resource production, and the like for the plant personnel or the automated system to monitor. If the energy system trips off line or an operational problem occurs, plant personnel can be notified of the malfunction and a solution team can be configured to get the energy system back up and running. The scheduling module generates a schedule of each energy system in the system and can provide the schedule to the performance module.

The performance module receives and uses the actual energy data, energy usage, and energy costs along with possible rate schedules, curtailments, down-times, irregular usage patterns, scheduling data, energy budget for the upcoming year with energy usage, energy cost, forecasts, historical trends, etc. The performance module can coordinate the information from the budget module and the scheduling module to create an executive overview, for example, of actual energy usage versus the budgeted energy usage. Each unit of measurement may have a variance associated with the actual versus budget for one to evaluate. A reporting module of the performance module can generate management reports on desired information, e.g., plant operations, cost, energy usage, budgets, and schedules. The performance module can compare the budget/forecasted data to actual cost, energy usage, budgets and schedules for use in variance reports. An executive overview report, which can be generated by the performance module, provides a quick observation of how well the equipment/plant operated based on the forecasted budget.

These and other objects, features, and advantages of the present invention will become more apparent upon reading the following specification in conjunction with the accompanying drawings.

DETAILED DESCRIPTION

Figure 1:
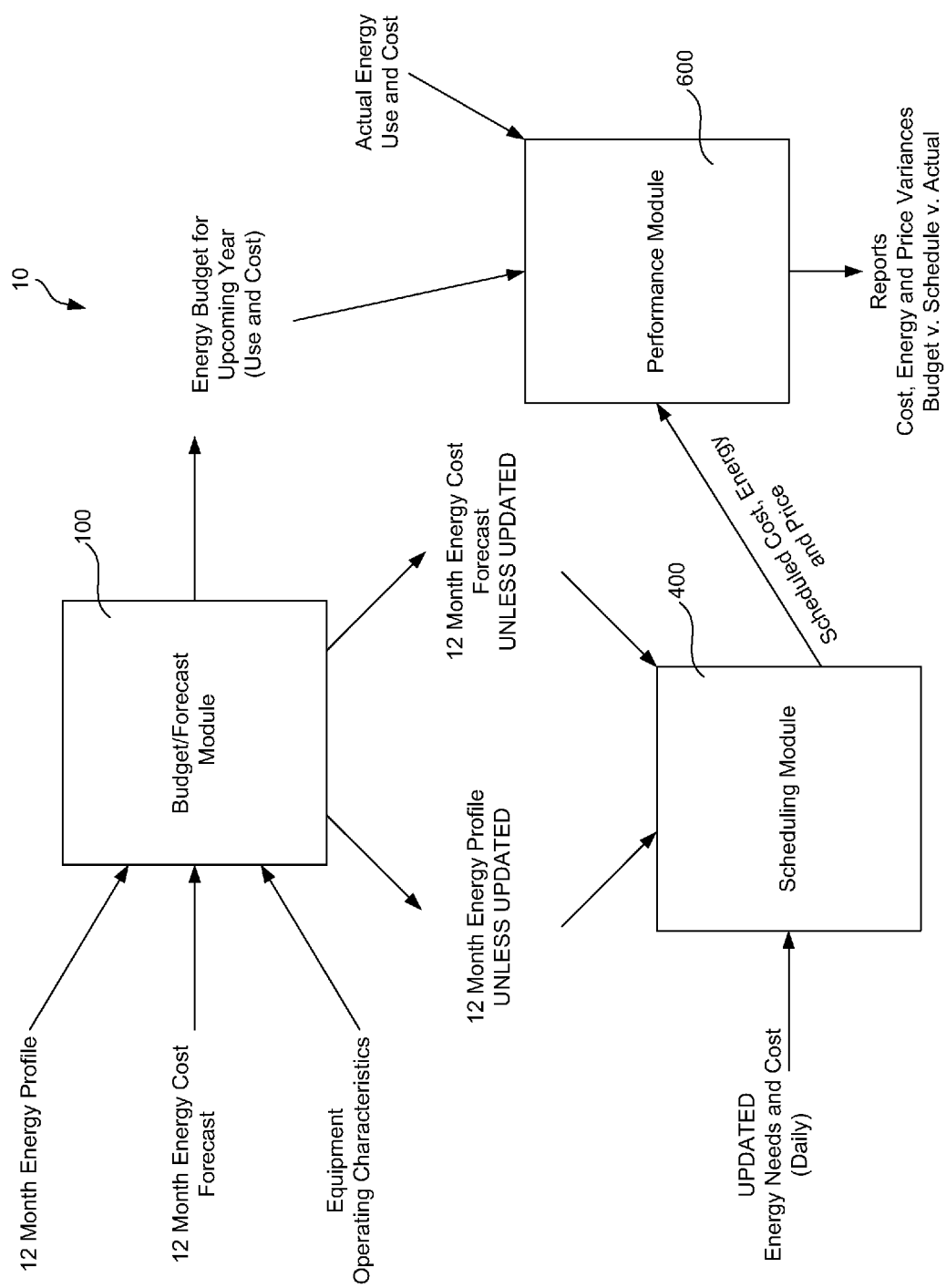
FIG. 1 displays a block diagram representation of an energy decision management system, in accordance with an exemplary embodiment of the present invention.

To facilitate an understanding of embodiments, principles, and features of the present invention, they are explained hereinafter with reference to implementation in illustrative embodiments. In particular, they are described in the context of being an energy decision management system.

Embodiments of the present invention, however, are not limited to use in the described systems. Rather, embodiments of the present invention can be used when a decision management system is desired or necessary. Thus, the system described hereinafter as an energy decision management system can also find utility as a system for other applications, beyond that of managing one or more energy systems.

The components described hereinafter as making up the various embodiments are intended to be illustrative and not restrictive. Many suitable components that would perform the same or a similar function as the materials described herein are intended to be embraced within the scope of embodiments of the present invention.

Referring now to the figures, wherein like reference numerals represent like parts throughout the views, embodiments of the present invention will be described in detail.

FIG. 1 displays a block diagram representation energy decision management system 10 for managing, controlling, or manipulating data to monitor, measure, or control one or more energy systems. The energy decision management system ("EDMS") 10 is a decision making tool that may be added to an existing energy management system, distributed control system, distributed data control system or other types of systems that manage, control, or manipulate data to monitor, measure, or control a plurality of energy systems. For example, the EDMS 10 can be retrofitted to existing energy system operations. In an exemplary embodiment, the EDMS 10 is a decision making system utilizing a modular approach by gathering data in real time and rendering decisions based on fuels, environmental impacts, societal impacts, and other factors. Each module works along side other modules that budget, schedule, or guide operations that affect performance.

In an exemplary embodiment, the EDMS 10 includes at least three modules or systems working together to render the information needed for a user to render decisions as to which energy system to operate, in which the desire is to minimize costs. As illustrated, in FIG. 1 the EDMS 100 includes a budget/forecast system/module 100, a scheduling system/module 400, and a performance system/module 600. The budget module 100 is configured to create a strategic energy decision plan to run various energy systems. The scheduling module 400 is configured to create an operational schedule to determine which energy system should be operated to minimize energy costs. The performance module 600 is configured to produce management reports to quantify operational issues and successes.

The budget module 100 houses an energy profile, energy costs (e.g., fuel oil, natural gas, electric, wood waste, coal, hybrid fuel, and the like), plant operating characteristics, bench marks, base load characteristics, plant usage forecasts, historical usage, and the like. This information can be handled in various time (e.g., hourly, daily, weekly, monthly, and annually) formats. In an exemplary embodiment, the budget module 100 can generate a 12 month forecast of projected energy prices, load shape, energy credits, trends, hourly, switching scenarios, run time, and gas displacement for carbon credits. This forecast can be communicated to the scheduling module 400.

The scheduling module 400 produces an operating schedule for the plant personnel and/or an automated system to monitor and maintain the operations of the energy system(s). The scheduling module 400 produces a running schedule based on projected energy prices, environmental issues/concerns, environmental credits, renewable resource production, and the like for the plant personnel and/or the automated system to monitor. If the energy system (e.g., a device, an end-use product, a machine, an asset, and/or a piece of equipment) trips off line or an operational problem occurs, a notification of the malfunction is created and then a solution team can be configured to get the energy system back up and running. The scheduling module 400 generates a schedule of the energy system running. This schedule can be provided to the performance module 600.

The performance module 600 stores the actual energy data, energy usage, and energy costs along with possible rate schedules, curtailments, down-times, irregular usage patterns, scheduling data, energy budget for the upcoming year with energy usage, energy cost, forecasts, historical trends, etc. In some embodiments, the performance module 600 can coordinate the information from the budget module 100 and the scheduling module 400 to create an executive overview of actual energy usage versus the budgeted energy usage. Each unit of measurement may have a variance associated with the actual versus budget for evaluation. A reporting module of the performance module 600 can generate management reports on desired information, e.g., plant operations, cost, energy usage, budgets, and schedules. The performance module 600 can compare the budget/forecasted data to actual cost, energy usage, budgets, and schedules for use in variance reports. The performance module 600 is adapted to generate an executive overview report, which can provide a quick observation of how well the energy system/equipment/plant operated based on a forecasted budget.

As illustrated in FIG. 1, the budget module 100 receives a plurality of inputs and generates at least one output. The outputs of the budget module 100 are in communication with at least one of the scheduling module 400 and the performance module 600. The inputs of the budget module 100 may include, but are not limited to, an energy profile (e.g., over 12 months), an energy cost forecast (e.g., over 12 months), and equipment (i.e., energy system) operating characteristics. An output of the budget module 100 can include an energy budget for an upcoming year. This energy budget can be one of many inputs to the performance module 600.

If the energy profile and the energy cost forecast are not updated, they can be inputs, respectively, for the scheduling module 400. On the other hand, even if they are updated, the updated data can also be the input to the scheduling module 400. The output of the scheduling module 400 can include the scheduled cost, energy, and price, which can be one of many inputs to the performance module 600.

The performance module 600 can receive the energy budget from the budget module 100 and the scheduled cost, energy, and price from the schedule module 400. The performance module may also receive the actual energy, use, and cost. The performance module 600 is adapted to generate reports, e.g., relating to cost, energy, and price variances and relating to budget versus schedule versus actual costs.

Figure 2:
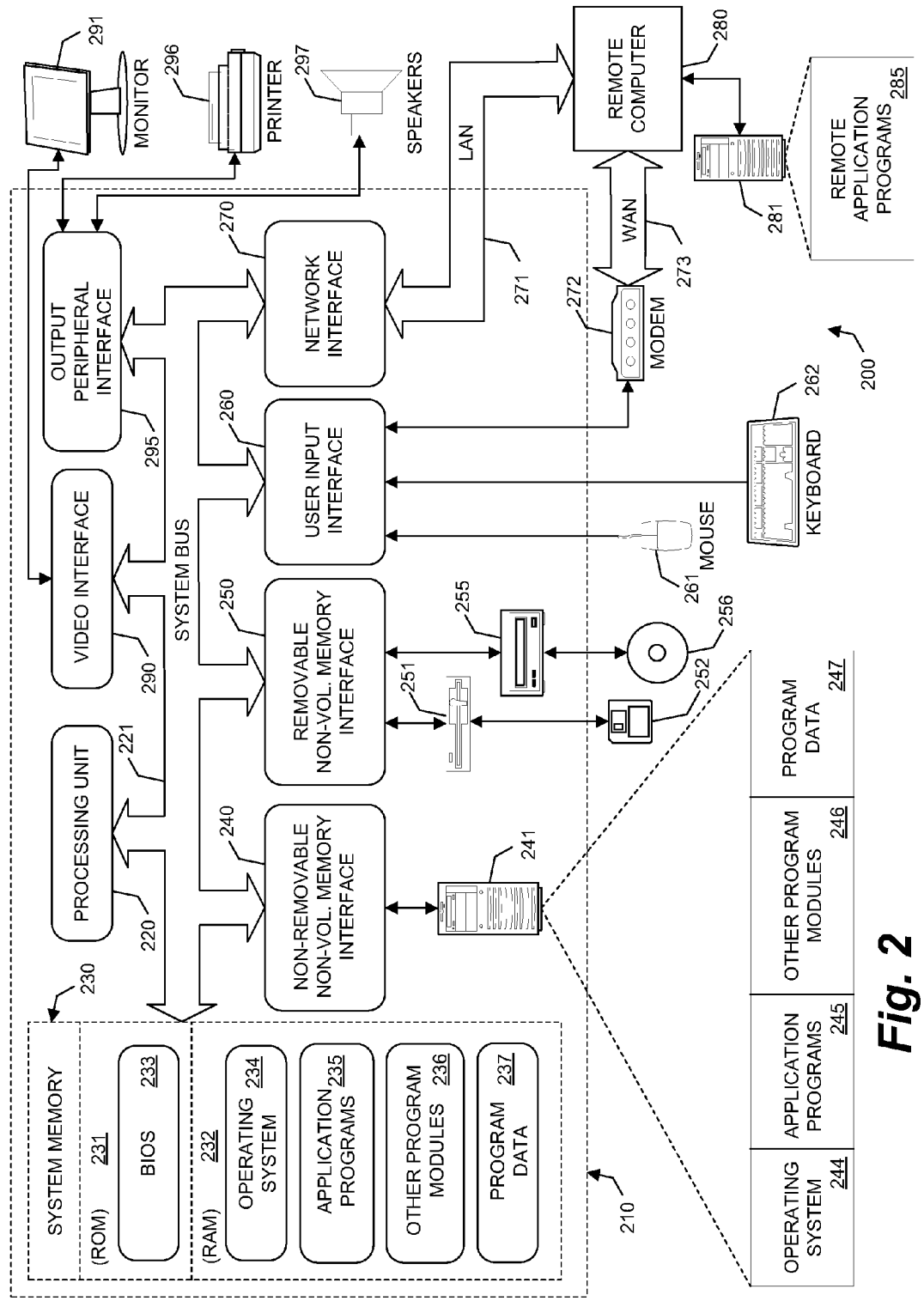
FIG. 2 displays a block diagram representation of a computing environment and computer systems thereof in which the energy decision management system of FIG. 1 may utilize, in accordance with an exemplary embodiment of the present invention.

Referring now to FIG. 2, it displays a block diagram representation of a computing environment 200 and computer systems 210, 280 thereof in which the energy decision management system 10 of FIG. 1 may utilize, in accordance with an exemplary embodiment of the present invention. The computing environment 200 and the computer systems 210, 280 represent one example of a suitable computing environment and computer systems for the practice of embodiments of the present invention and are not intended to suggest any limitation as to the scope of use or functionality of the invention. Nor should the computer systems 210, 280 be interpreted as having dependency or requirement relating to the combination of components illustrated in the exemplary computing environment 200.

Embodiments of the present invention are operational with numerous other general purposes or special purposes computing system environments or configurations. Examples of well-known computing systems, environments, and/or configurations that may be appropriate or suitable for use as client systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include portions of the above systems or devices, and the like.

Embodiments of the present invention may also be described in the general context of comprising computer-executable instructions, such as program modules, being executed by a computer system. Generally, program modules include routines, programs, programming, objects, components, data, data structures, and the like that perform particular tasks or implement particular abstract data types. Embodiments of the present invention may be practiced in distributed computing environments where tasks are performed by remote processing devices that are linked through a communications network. In a distributed computing environment, program modules may be located in both local and remote computer storage media, including, without limitation, in memory storage devices.

Exemplary client systems, telephony home servers, and proxy servers may comprise general purpose computing devices in the form of the computer system 210, as illustrated in FIG. 2. Components of the computer system 210 may include, but are not limited to, a processing unit 220, a system memory 230, and a system bus 221 that couples various system components including the system memory 230 to the processing unit 220 for bi-directional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (i.e., also known as the "Mezzanine bus").

The computer system 210 can include and interact with a variety of computer-readable media. The computer-readable media may comprise many available media that can be accessed by, read from, or written to by the computer system 210 and may include both volatile and nonvolatile, removable, and non-removable media. For example and not limitation, computer-readable media may comprise computer storage media and communication media. Computer storage media includes volatile and nonvolatile, removable, and non-removable media implemented in many methods or technologies for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or other media that can be used to store the desired information and may be accessed by computer system 210. Communication media typically embodies computer-readable instructions, data, data structures, program modules, programs, programming, or routines in a modulated data signal, such as a carrier wave or other transport mechanism and includes any information delivery media. The term "modulated data signal" means a signal that has one or more of its characteristics set or changed in such a manner as to encode information in the signal. For example and not limitation, communication media includes wired media such as a wired network or direct-wired connection, and wireless media such as acoustic, RF, infrared and other wireless media. Various combinations of the above are also included within the scope of computer-readable media.

The system memory 230 may include computer storage media in the form of volatile and/or nonvolatile memory such as read only memory (ROM) 231 and random access memory (RAM) 232. A basic input/output system 233 (BIOS), containing the basic routines that direct the transfer of information between elements within the computer system 210, such as during start-up, is typically stored in ROM 231. RAM 232 typically stores data and/or program instructions that are immediately accessible to and/or presently being operated on by the processing unit 220. By way of example, and not limitation, FIG. 2 illustrates an operating system 234, application programs 235, other program modules 236, and a program data 237, which may be resident in RAM 232, in whole or in part, from time-to-time.

The computer system 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above provide storage of computer-readable instructions, data, data structures, program modules, programs, programming, or routines for computer system 210. For example, the hard disk drive 241 stores operating system 244, application programs 245, other program modules 246, and program data 247. These components may either be the same as or different from operating system 234, application programs 235, other program modules 236, and program data 237. The operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices, such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device may be also connected to the system bus 221 via an interface, such as a video interface 290. In addition to the monitor 291, the computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of the remote computer system 280 has been illustrated in FIG. 2. The bi-directional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limitation, FIG. 2 illustrates remote application programs 285 as residing in memory storage device 281. The network connections shown are exemplary and other means of establishing a bi-directional communication link between the computers may be used.

In an exemplary embodiment, the EDMS 10 system and method can operate on the computer system 210, and can be stored on a medium or media part of, in communication with, and/or connected to the computer system 210. In an exemplary embodiment, the energy decision management system 10 can be developed in a programming language, for example and not limitation C, C++, Java, Assembly, COBOL, and the like. In an alternative embodiment, the EDMS 10 can be developed atop a software program, for example and not limitation, LOTUS, Microsoft Excel, and other spreadsheet-like applications.

The EDMS 10 provides a system and a method for providing a flexible approach for conducting strategic energy decisions, optimizing a plant's operation, scheduling, economic dispatch, and forecasting, planning and operational cost analysis, and determining operations performance based on said criteria. The EDMS 10 system and method can provide a unifying framework to both communicate strategic energy decisions, operational procedures, economic dispatching, energy demand forecasting, and schedule commitments based on fuel prices and operational cost/benefits relating to strategic energy decisions to operational equipment/energy systems.

Figure 3:
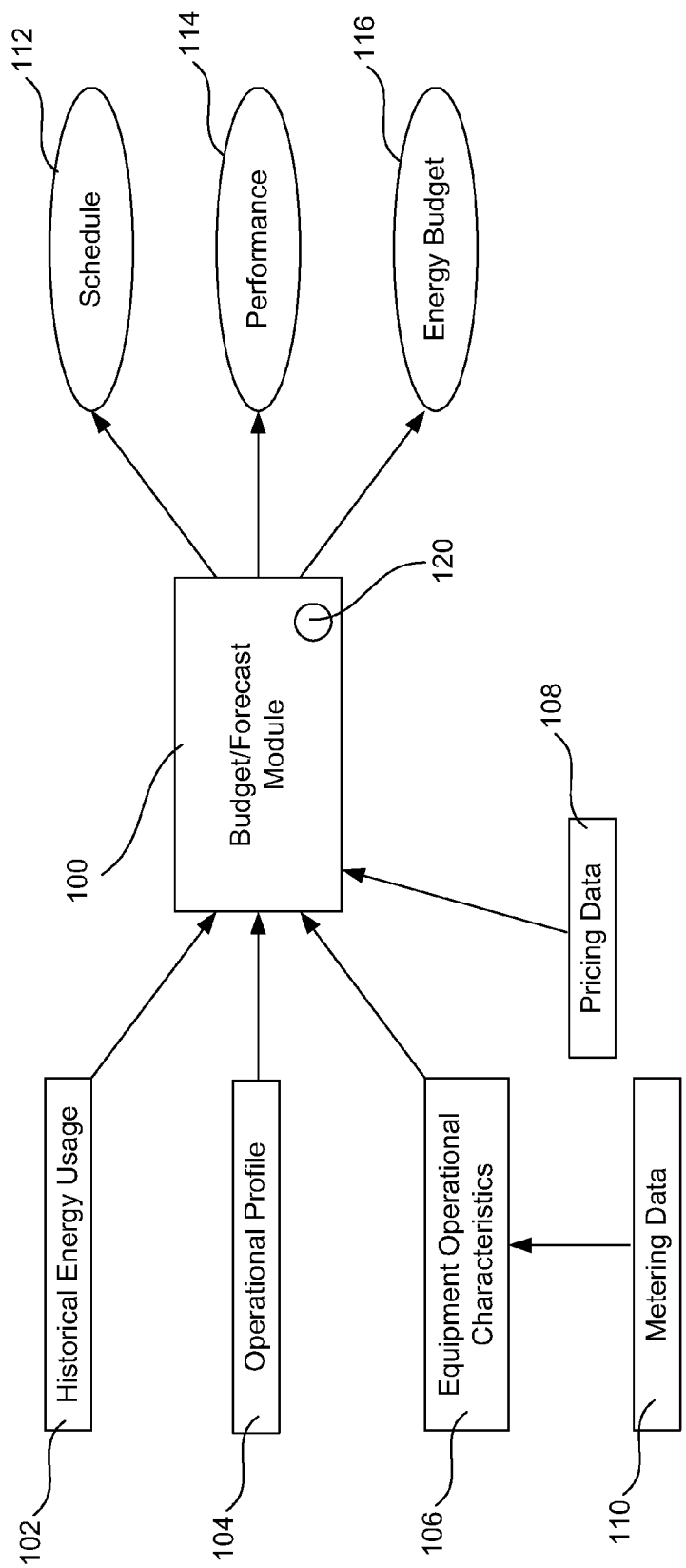
FIG. 3 displays a block diagram representation of a budget module of the energy decision management system, in accordance with an exemplary embodiment of the present invention.

Referring now to FIG. 3, it displays a block diagram representation of the budget module 100 of the energy decision management system 10, in accordance with an exemplary embodiment of the present invention. As depicted in FIG. 3, the budget module 100 can receive a plurality of inputs and generates a plurality of outputs. As illustrated, historical energy usage 102, an operational profile of an energy system 104, operational characteristics 106 of an energy system, and pricing data are exemplary inputs 108. Metering data 110 may be channeled through a programmable logic controller (PLC) system, a remote terminal unit (RTU) system, and/or an automatic metering instrument (AMI) system, for providing operational characteristics for the budget module 100. The metering data 110 may further include pricing data for different fuel sources fed into the module 100. In an exemplary embodiment, this can be handled by various communication protocols, including but not limited to an extensible markup language (XML), a distributed data communications server (DDCS), and the like. The outputs (e.g., a schedule 112, performance 114, and/or an energy budget 116) of the budget module 100 can be in communication with the scheduling module 400, as well as the performance module 600.

In an exemplary embodiment, the budget module 100 receives some or all of the following exemplary inputs: pricing forecasts for the upcoming year for at least two competing fuels, wherein such forecast may be provided or mapped to all 8,760 hours for the upcoming year; environmental credits and/or debits associated with each fuel; energy use projection for the upcoming year, wherein this may represent steam needs (production needs) for all 8,760 hours in such upcoming year; and operating characteristics of an energy system, including fuel conversion efficiencies and start and idle costs.

An economic equipment dispatch logic system 120 may be included in the budget module 100. The logic system 120 uses the input data to determine which energy systems, should be economically dispatched during each predetermined period for the upcoming year. For each time period, e.g., hour or day, the total cost for each energy system may be determined. This cost may include environmental costs, including all hourly energy costs being corrected to include environmental debits and/or credits. This may also include the cost to produce steam and/or hot water, which can be generated from energy/steam/hot water needs and energy system-specific fuels needs, taking into consideration for energy system efficiency, for that specific hour. In addition, this cost can include the cost of the non-dispatched energy system in an idle state, as well as the costs associated with starting one of the energy systems. For instance, the budget module 100 can take into consideration whether the energy system was operating at a particular time, and if it was there is no start up cost to be calculated; on the other hand, if the energy system was not operating at a particular time, then the module calculates the cost to start it up.

Ultimately, the cost may be summed to obtain the total cost for the given time period, e.g., for each hour. In the end, the energy system with the lowest operating cost for the given time period can be dispatched and is recommended to operate during such a time period. For example and not limitation, this comparison may be made for each hour of the year. The energy used and the cost for each fuel source is captured and compiled on a given time basis, e.g., on a monthly and annual basis. The result may represent the optimal (i.e., lowest cost) of using the available energy systems. Further, the annual energy and cost by fuel type may represent the energy use and cost budget for the upcoming year.

Put another way, the logic system 120 uses the data available to determine which energy system should be economically dispatched during a given period, e.g., for the upcoming 12 months. In an exemplary embodiment, for each hour in the period, the total cost for each energy system is determined. This cost may include:
  Environmental costs
  All hourly energy costs are corrected to include any environmental debits/costs;
  Cost to produce steam/hot water
  This is based on energy/steam/hot water needs and energy system-specific fuel (corrected for energy system efficiency) for that specific period;
  Idling cost of other energy system(s)
  This is based on other energy systems' operating characteristics and energy system-specific fuel (corrected for energy system efficiency) for that specific period;
  Cost to start the energy system, if any
  This is based on referring to the previous period to determine if the energy system was operating. If the energy system was operating in the previous period, there is no start up cost; and
  This is based on the energy systems' operating characteristics and energy system-specific fuel (corrected for energy system efficiency) for that specific period.

For instance, each hour of cost can be summed to obtain the total cost for the given period. The energy system with the lowest operating cost for said period is dispatched to produce steam. Exemplarily, this comparison may be made for each hour in each period for the year. The energy use and cost for each fuel source may be captured and compiled on a periodic, e.g., a monthly and annual, basis. The result may represent the optimal (lowest cost) utilization of energy resources. The annual energy and cost by fuel type may also represent the energy use/cost budget for the upcoming year.

The budget module 100 may also include a method for creating a strategic energy decision plan to run various end-use products, or energy systems, such as but not limited to steam systems, chillers, infrared processes, turbines, and the like. The strategic plan can create a model, based on historic energy costs, operational profiles, and energy systems' operational characteristics. Collectively, this can provide a bench mark on historical, as well as real time data and, ultimately, permit a comparison between real data and a forecast.

The energy decision management can have a number of inputs, which can be hard wired into a controller, such as a programmable logic controller (PLC). Exemplarily operational inputs for a boiler, wherein devices are wired back to a PLC, e.g., with a 4-20 ma Analog loop, include but are not limited to:
  Stack temperature;
  Boiler temperature;
  Oxygen (O2) sensor readings;
  Combustion air temperature;
  Steam pressure;
  Steam flow/water temperature;
  Natural gas flow/water flow;
  Water temperature;
  Water flow-feed water valve positions;
  Water levels;
  Firing rate;
  Combustion burner fan rotations per minute (RPM);
  Combustion air pressure;
  Boiler pressures hi and low settings;
  Conductivity probe;
  Back pressure control valve positions;
  Variable speed drive (VSD) on combustion fans;
  Water metering;
  Natural gas metering;
  Steam metering;
  Pressure sensors;
  Temperature probe readings in a stack;
  Temperature probe readings in a boiler;
  Feed water metering; and
  Feed water temperature probe readings.

Exemplarily operational inputs for an electric boiler, wherein devices are wired back to a PLC, e.g., with a 4-20 ma Analog loop, include but are not limited to:
  Watt meter readings;
  Amp meter readings;
  Volt meter readings;
  Conductivity sensors;
  Pump RPM;
  Feed water valve information;
  High/low level sensors;
  Pressure sensors;
  Temperature sensors;
  Chemical feed pump information;
  Hydraulic positions of Shroud;
  Pump head pressure readings; and
  Cooling water flow rate.

Other exemplarily inputs for a module, which can be inputted either manually or automatically, include but are not limited to:

General Prices:
Fixed prices (based load or time of use)
RTP
Strips, caps, and collars
Blended rates—FP/TOU, RTP/Strips or collars
Alternative dispatch
Operational and maintenance
Capital/asset management
Market Pressures:
Natural gas curtailment
Electric capacity uncertainty
Supply, delivery, and reliability inputs
Risk
Peak/marginal pricing
Transmission congestion
Ancillary services
Grid instability
Fossil Fuel Prices:
Natural gas prices
Fuel oil prices—e.g., fuel oil #2 and #6
Biofuel prices—e.g., Diesel and OFFA1 (rendering plant stuff)
Coal prices
Wood waste prices
Rubber prices
Market prices
Environmental Inputs:
Daily, monthly, hourly credits on reducing $CO_2$, $NO_x$, $SO_x$ or any waste into the environment.
Water—plant discharge
$SO_x$ info calculated
$NO_x$ info calculated
Mercury info calculated
Non-attainment
Cogeneration:
All of the boiler information above
Price of generation costs
Price to sell back to utility
Societal (green/sustainability):
Resources sustainability
Renewables/renewable energy certificate/green tags
Efficiency/white tags
Carbon allowances/credits
Cap and trade market
Demand Side Management:
Metering information from both natural gas utility, and electric utility
  May have the capability to interrupt natural gas and electricity depending on the utility.

Figure 4:
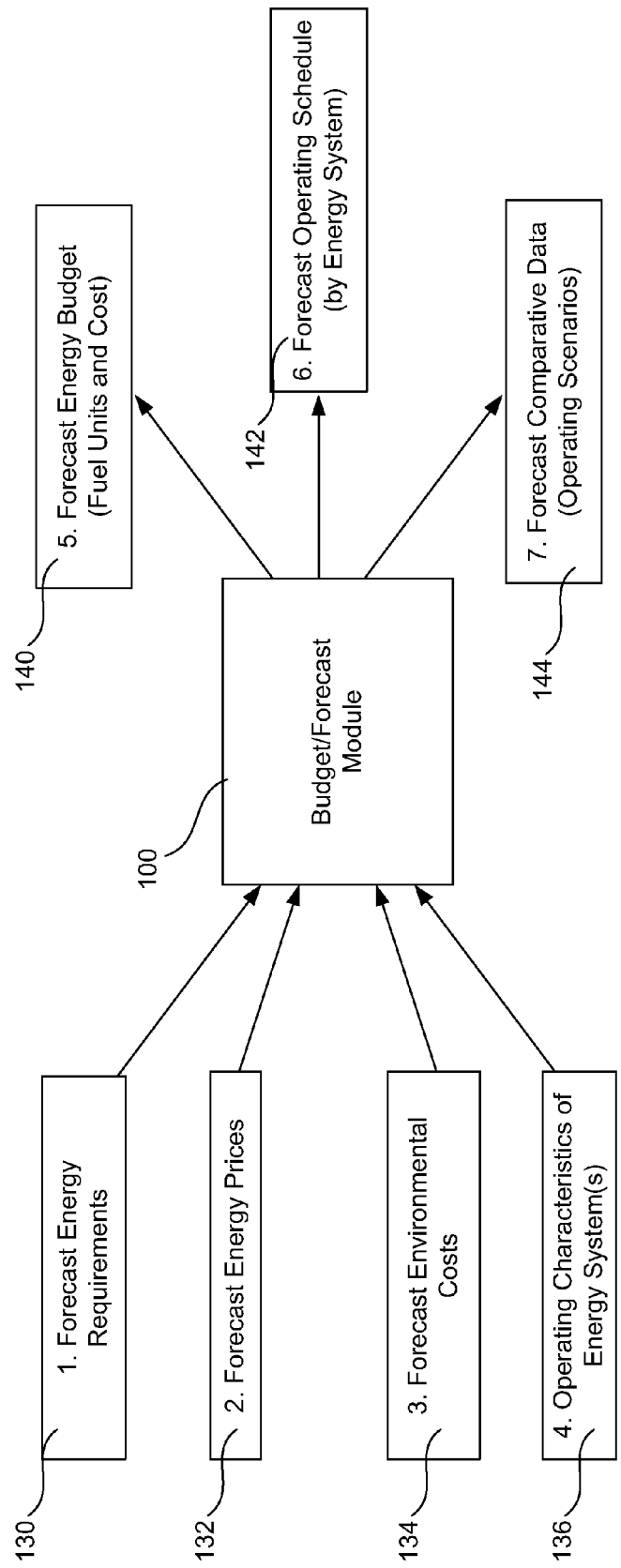
FIG. 4 displays another block diagram representation of the budget module of the energy decision management system, in accordance with an exemplary embodiment of the present invention.

FIG. 4 illustrates another block diagram representation of the budget module, in accordance with an exemplary embodiment of the present invention. The budget module 100 receives a number of inputs, evaluates same, and generates a desired number of outputs. For example, the budget module 100 of FIG. 4 can utilize its inputs to evaluate the operating costs for each energy system for every hour of a given year. The costs of starting and idling energy systems may be included in this evaluation. In the end, the energy system with the lowest operating costs for the period may be dispatched.

As illustrated in FIG. 4, the budget module 100 is adapted to receive at least four inputs, including forecast energy requirements 130, forecast energy prices 132, forecast environmental costs 134, and operating characteristics 136 of energy systems. The forecast energy requirement 130 may include the forecasted 12 month energy usage by hour, and can represent the production or steam needs of the facility or plant. This information may be derived from utility metered data. The forecast energy prices 132 may include the forecasted 12 month energy cost by hour for fuels used by the energy system(s). The forecast environmental cost 134 may include the forecasted 12 month environmental energy credits, debits, incentives, and/or penalties per hour. The operating characteristics 136 of an energy system may include the fuel conversion efficiency, the start, stop and idling costs and other considerations and information available that may impact operating economics.

As further illustrated in FIG. 4, the budget module 100 is adapted to generate at least three outputs, including a forecast energy budget 140, a forecast operating schedule 142, and a forecast comparative data set 144. The forecast energy budget 140 may include a derived 12 month energy usage by fuel units and cost, which may be based preferably on the most cost efficient energy system utilization. The forecast operating schedule 142 may include the derived 12 month operating schedule by hour of each energy system, based preferably on the most cost efficient energy system utilization. The forecast comparative data set 144 may include a comparison of different energy system utilization scenarios, wherein indicating economic benefits. The forecast comparative data set 144 is adapted to be customized for a specific user and/or industry.

As mentioned, in an exemplary embodiment, the budget module 100 can include a plurality of inputs and at least one output.

A first exemplary input to the budget module 100 includes forecasted energy usage (for a predetermined duration, for example 12 months) by hour for all 8760 hours in upcoming year. This example input can represent production or steam needs, and may be generated from utility metered data. Another exemplary input to the budget module 100 includes forecasted energy process (again, for a predetermined duration, for example 12 months) by hour for all 8760 hours in an upcoming year for fuels utilized by devices and/or assets to the system. Yet another exemplary input to the budget module 100 is a forecasted environmental energy credit, debit, incentive, penalty (for a predetermined duration, for example over 12 months) by hour for all 8760 hours in the upcoming year. Another exemplary input includes asset characteristics, for example and not limitation fuel conversion efficiency, starts, stops, and idling costs, as well as other considerations that may input operating economics.

An exemplary output of the budget module 100 includes a derived energy usage (for a predetermined duration, such as 12 months) by fuel units and cost, which can be based on the most cost efficient use. Another exemplary output of the budget module 100 includes a derived operating schedule (for a predetermined duration, such as 12 months) by hour of each asset, which can be based on the most cost efficient asset use. For example, for maintenance planning, the run times and the number of starts/stops for each device may be included in this output. Yet another exemplary output of the budget module 100 includes a comparison of different asset use scenarios illustrating and showing economic benefits. This output, like others, may be customized for a specific user and/or industry.

Given more than one device, one exemplarily purpose of the budget module 100 is to schedule a device that can provide the most economic delivery of energy during any given period. A period can vary in length, but represents the minimum period of time a device will be operated before switching to a lower-cost device. This period can be driven by device economics, convenience, mechanical limitations, and the like.

For every period, the cost of delivering the required energy for each device can be determined by the budget module 100. The budget module 100 considers the cost of fuel, the device operating characteristics, any environmental credits/debits, the cost of starting or stopping, and the standby costs of the other available devices. In some embodiments, the cost of starting the device is determined by looking at the prior period to see which device was operating. The device with the lowest energy delivery cost can be selected for operation for that period.

This evaluation is performed for different operating periods. For example and not limitation, exemplary operating periods can be of one hour, two hours, four hours, eight hours, 12 hours, and 24 hours for a budget year. The economic benefits of operating by period over the course of a year can then be compiled. A report (annual, by month) for each of the different operating periods containing the energy units and costs by fuel type can be generated. This report can represent the least-cost energy budget/forecast and device operating schedule by period based on the inputs. The user then has the option of choosing which hourly device operating period best meets the plant's needs.

In selecting the operating periods with the budget module 100, the user can take into consideration factors beyond the simple cost of operation. For instance, the user may determine that longer periods of operation with slightly higher energy costs, may be more advantageous when considering the maintenance costs associated with more stopping and starting, or the higher labor costs of operating the equipment.

Referring back to FIG. 1, the output(s) of the budget module 100 can be in communication with one or both of the scheduling module 400 or the performance module 600. In other words, the forecast energy budget 140, a forecast operating schedule 142, and a forecast comparative data set 144 of FIG. 4 may be fed to either or both of the scheduling module 400 and/or the performance module 600.

Figure 9:
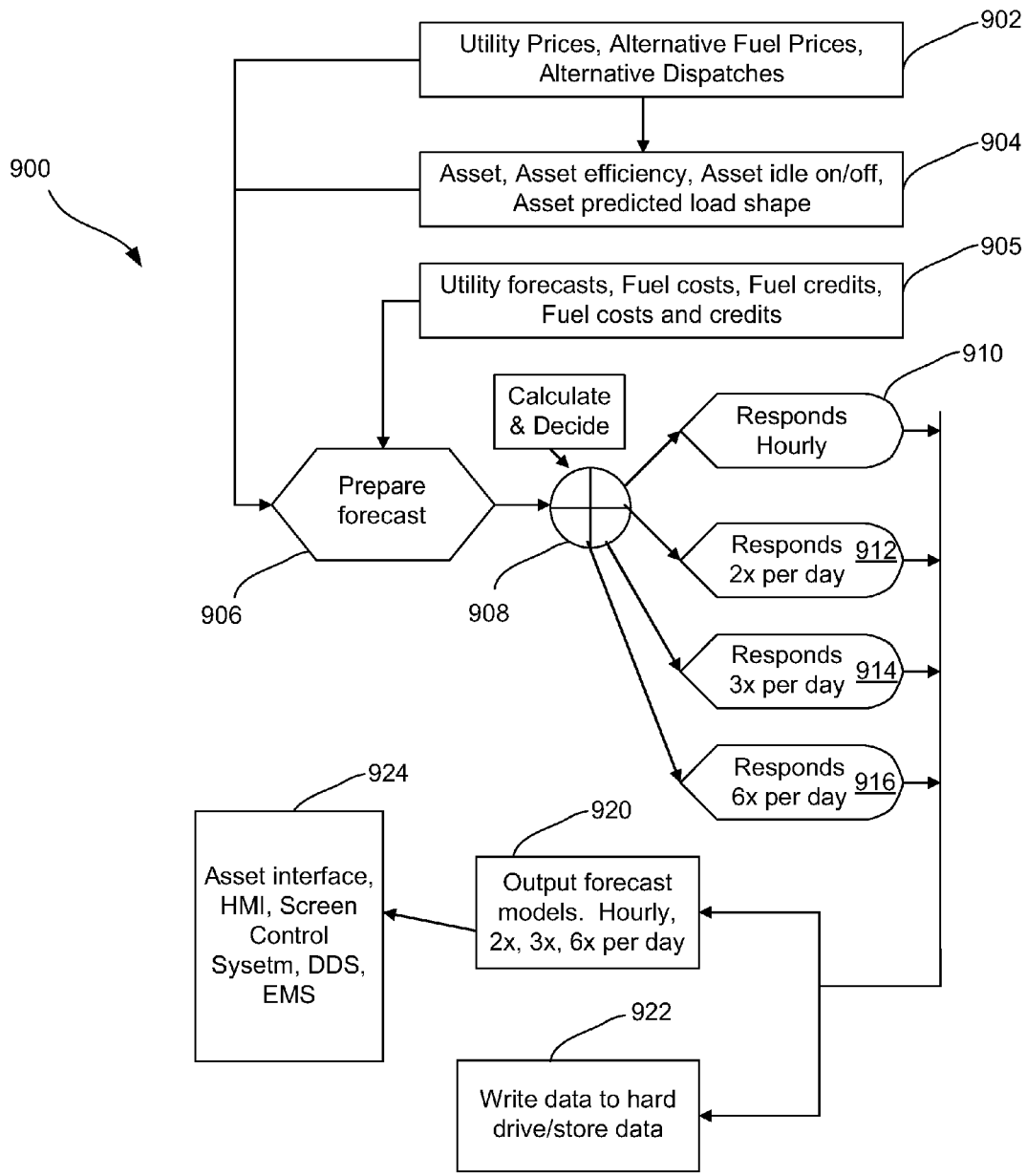
FIG. 9 displays a block diagram representation of another budget module of the energy decision management system, in accordance with an exemplary embodiment of the present invention.
Figure 10:
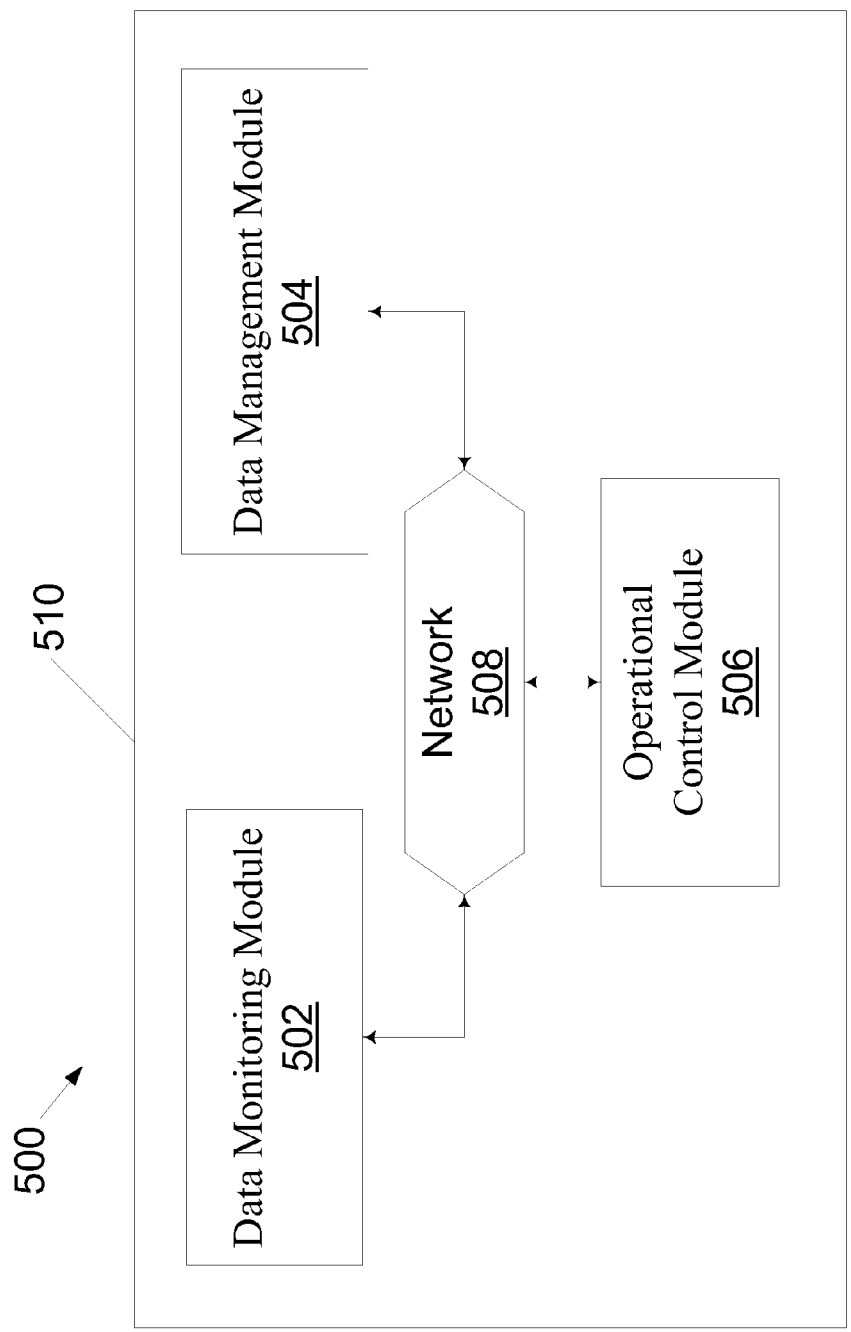
FIG. 10 displays a block diagram representation of an energy control system to be used by the energy decision management system, in accordance with an exemplary embodiment of the present invention.

In another exemplary embodiment of the present invention, an EDMS 10 can be implemented in accordance with the block diagram representation of the budget module 900 of FIG. 9. In the budget module of FIG. 9, utility prices, alternative fuel prices, asset rate structures and alternative dispatches 902 and an energy system, energy systems' efficiency, idle on/off of energy systems, asset predicted load shape 904 are inputs to a step 906 of preparing the forecast. In addition, the utility prices, alternative fuel prices, asset rate structures and alternative dispatches 902 can be an input to the asset, asset efficiency, asset's idle on/off, and asset predicted load shape 904. Utility forecasts, fuel costs, fuel credits, and fuel costs and credits 905 can be an input to the step 906 of preparing the forecast. The step 906 of preparing the forecast may generate at least one output, which is in communication at 908 calculating and deciding. A 908 an output of a number of outputs based on the timed responses, including but not limited to responds hourly 910, responds twice/day 912, responds three times/day 914, and responds six times/day 916 can be calculated and decided. The outputs of the responses 910, 912, 914, 916 are in communication with an output forecast model 920 as well as a step 922 for writing data for a hard drive and/or storing data for future use. The step 920 can be output to a system 924, which may include an asset interface, a human-machine interface (HMI), a screen (e.g., a monitor), a control system, and the like.

Figure 5:
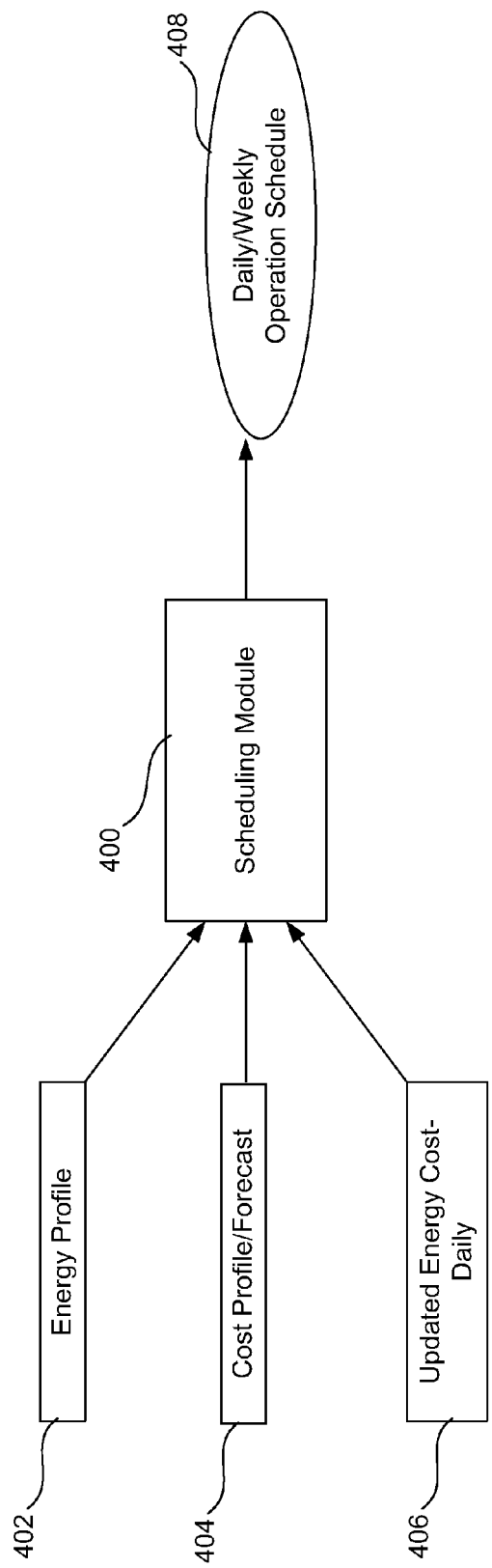
FIG. 5 displays a block diagram representation of a scheduling module of the energy decision management system, in accordance with an exemplary embodiment of the present invention.

Referring now FIG. 5, a block diagram representation of a scheduling module 400 is illustrated. The scheduling module 400 may create an operational schedule to dispatch the energy system based on plant operations, environmental criteria, historical and forecasted prices, and the like. The scheduling module 400 can make an economic dispatch of the system and determine which energy system is best to operate, based, for example, on different fuel choices and or other criteria.

As FIG. 5 illustrates, the scheduling module 400 can receive a plurality of inputs, and can generate at least one output. The scheduling module 400 of FIG. 5 illustrates three inputs, i.e., an energy profile 402, a cost profile/forecast 404, and an updated energy cost 406. Based on the criteria desired, the scheduling module 400 outputs an operation schedule 408 based on a given time frame, e.g., per hour, day, month, and the like.

Figure 6:
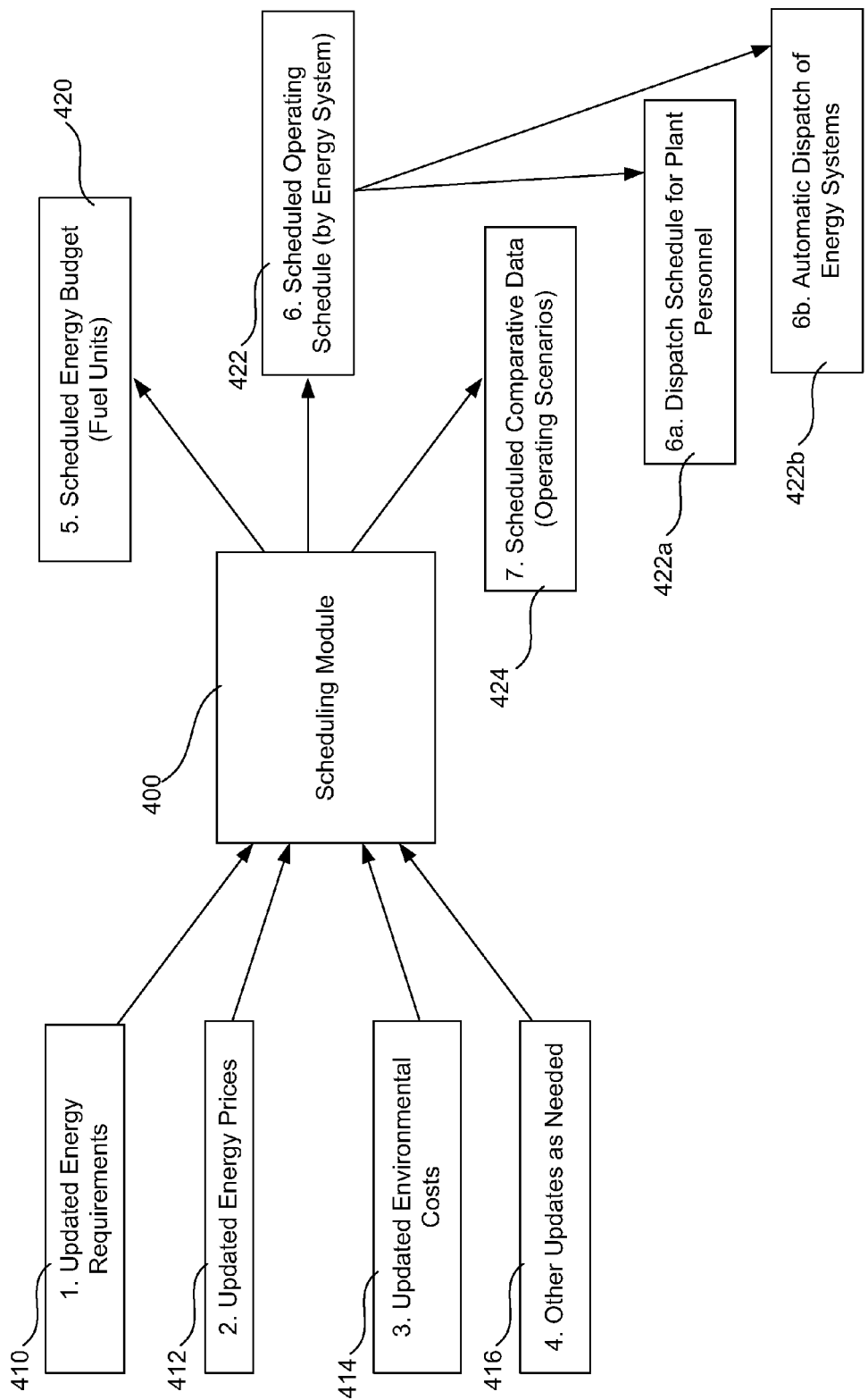
FIG. 6 displays another block diagram representation of the scheduling module of the energy decision management system, in accordance with an exemplary embodiment of the present invention.

FIG. 6 depicts another block diagram representation of the scheduling module 400. The scheduling module 400 includes inputs that may be updated to evaluate costs with the most current costs and production information. These updates are updated as often as possible to ensure accurate economic decisions are made. The scheduling module 400 may generate a dispatch schedule for plant personnel to use for manual dispatch/review. Alternatively, the scheduling module may communicate directly with the energy system(s) for automated dispatch of the energy system 400 that minimizes costs.

As FIG. 6 illustrates, the scheduling module 400 can receive a number of inputs, including but not limited to updated energy requirements 410, updated energy prices 412, updated environmental costs 414, and other updates 416. The scheduling module 400 can generate a number of outputs, including but not limited to a scheduled energy budget 420, a schedule operating schedule 422, and a scheduled comparative data set 424. The scheduled operating schedule 422 can forward the schedule either to plant personnel 422a for manual dispatch of an energy system, or directly to the energy system for automatic activation 422b of an energy system.

Like the budget module 100, the scheduling module 400 can include a plurality of inputs and generate at least one output.

An exemplary input to the scheduling module 400 includes a term energy usage requirement. This requirement can be updated or updateable, and be based on a predetermined duration, e.g., daily or weekly. The requirement may be broken down per hour. Another exemplary input is a term energy price for fuel. The fuel price can be updated or updateable, and be based on a predetermined duration, e.g., daily or weekly. The price can be broken down per hour. In addition, the price provided is preferably from devices or assets that can be used by the plant. Yet another input to the scheduling module 400 includes a term environmental unit. The environmental unit can be, among other things for example and not limitation, credits, debits, incentives, penalties and the like. The environmental unit can be updated or updateable, and be based on a predetermined duration, e.g., daily or weekly. The environmental unit can be broken down per hour. Another exemplary input to the scheduling module 400 includes an asset characteristic. The asset characteristic can include, among other things, for example and not limitation, fuel conversion efficiency, start-up costs, stopping costs, idling costs, as well as other considerations that can input operating economics.

An exemplary output of the scheduling module 400 includes scheduled energy usage by fuel units and cost based on the most cost efficient asset utilization. Another exemplary output of the scheduling module 400 is scheduled operating schedule for a given duration, for example by hour, of each asset based on the most cost efficient asset utilization. For example, for maintenance planning, the run times and number of stops/starts for each device can be included in this output. Yet another exemplary output of the scheduling module 400 includes a dispatch scheduled report for use, for example by plant personnel, for manual device operation and/or automatic enabling/disabling of equipment via electronic interconnections.

In some embodiments, the scheduling module 400 can use updated energy cost and requirements to ensure that energy is being delivered at the lowest cost. Dispatch logic as described above for the budget module 100 can fulfill this task. These updates can be real-time prior to the production of the energy.

Further, in some embodiments, reports detailing how the devices can most efficiently be dispatched by period can be generated for plant personnel use. In some embodiment, these reports can be used by plant personnel for the manual operation of the equipment, while in the same or alternative embodiments, the reports can also be used for automatic operation of the energy devices.

Figure 7:
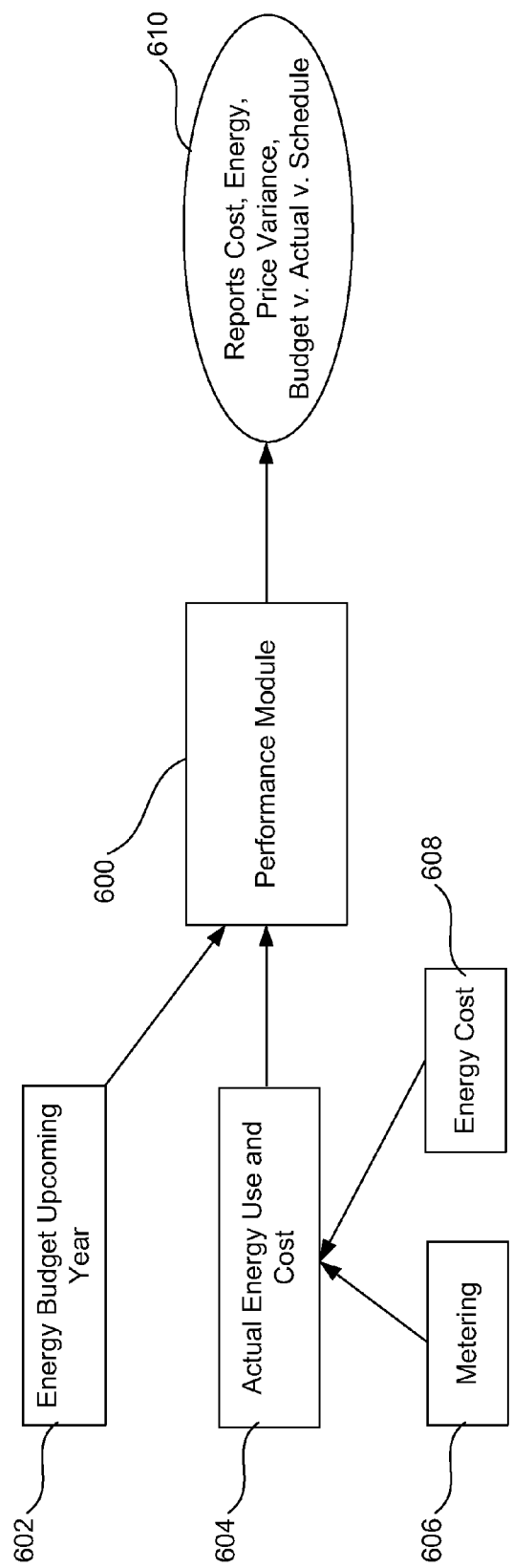
FIG. 7 displays a block diagram representation of a performance module of the energy decision management system, in accordance with an exemplary embodiment of the present invention.

The output of the scheduling module 400, as shown in FIG. 1, can be an input for the performance module 600. FIG. 7 illustrates a block diagram representation of the performance module 600, in accordance with an exemplary embodiment of the present invention. The performance module 600 generates management reports based on cost, energy, and price variances, and also with the budget versus the schedule versus the actual cost, for example. As FIG. 7 illustrates, the performance module 600 can receive one or more inputs, including but not limited to an energy budget for upcoming year 602, which is an output of the budget module, and an actual energy use and cost 604. The actual energy use and cost 604 can include metering 606 and energy costs 608. An output of the performance module 600 includes one or more reports 610, which can detail cost, energy, and price variances of energy systems, and the budget versus the schedule versus the actual cost.

Figure 8:
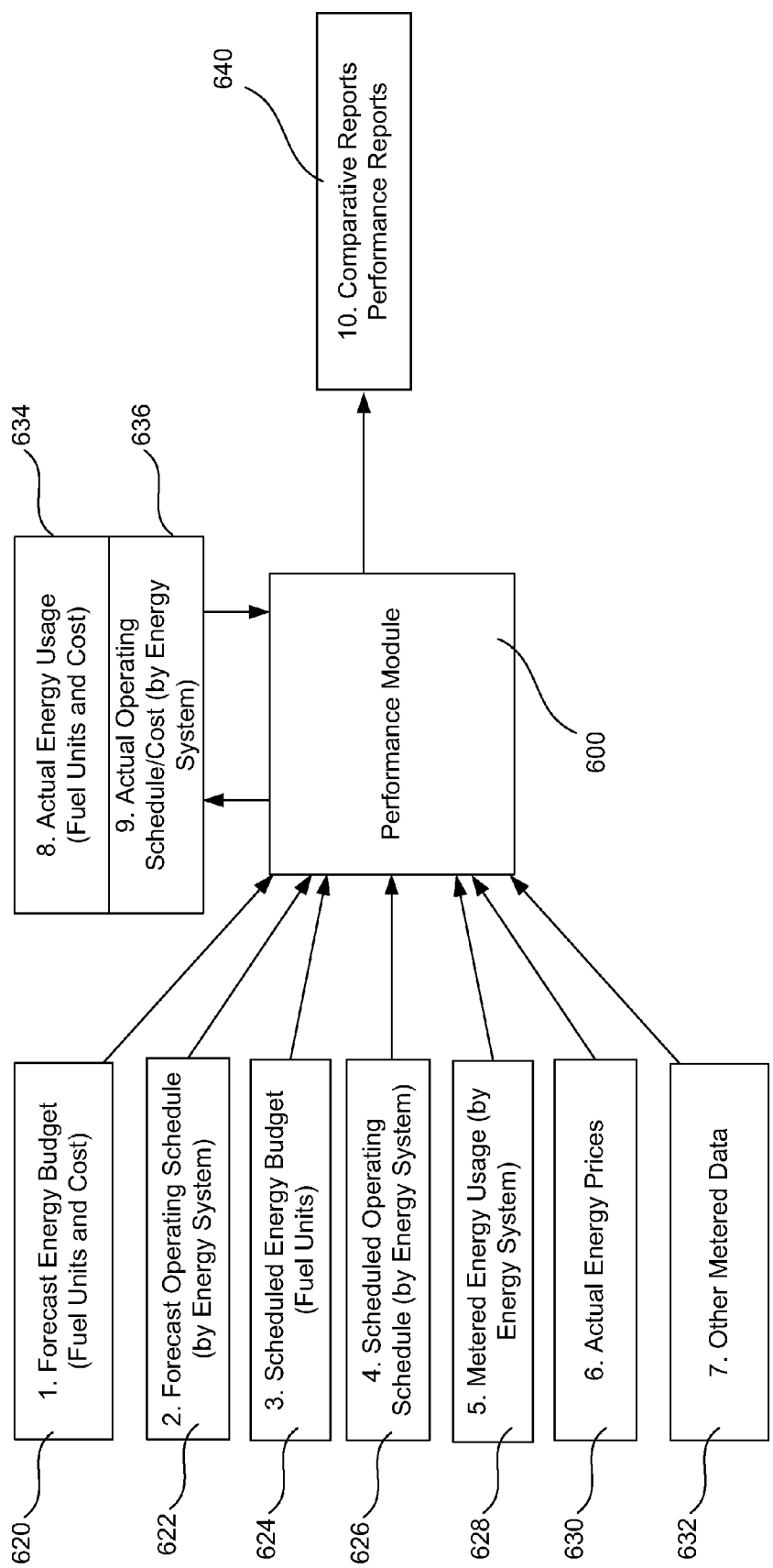
FIG. 8 displays another block diagram representation of the performance module of the energy decision management system, in accordance with an exemplary embodiment of the present invention.

Referring now to FIG. 8, another block diagram of the performance module is depicted. The performance module 600 is adapted to receive a number of inputs, including but not limited to a forecast energy budget 620, a forecast operating schedule 622, a scheduled energy budget 624, a scheduled operating schedule 626, a metered energy usage 628, actual energy prices 630, and other metered data 632. In addition, actual energy usage 634 and actual operating schedule/costs 636 can be either an input to the performance module and/or an output. The performance module is adapted to prepare comparative and performance reports 640.

Accordingly, as shown in FIG. 8, in addition to the inputs from the budget module 100 and the scheduling module 400, the performance module 600 can receive actual metered data from energy systems, along with actual energy prices to determine actual operating costs of the energy system. The actual operating data can then be compared to the forecast and scheduled data for example as generated from the budget module 400. Individual metered energy system data, such as temperature, pressure, alert systems, and the like are also input into the performance module 600, so that energy system performance can be evaluated and optimized. The comparative reports 640 may include comparisons of actual to predicated energy usage by fuel type, actual to predicted energy cost by fuel type, and predicted fuel costs. Ultimately, the reports from the performance module 600 can be customized based on the needs of the user.

Like the budget module 100 and the scheduling module 400, the performance module 600 can include a plurality of inputs and generate at least one output.

An exemplary input to the performance module 600 includes energy cost and usage from one or both of the budget module 100 and/or the scheduling module 400. Another exemplary input to the performance module 600 is scheduling/operating data from one or both of the budget module 100 and/or the scheduling module 400. Yet another exemplary input includes metered energy usage from each energy device. In some embodiments, the metered energy usage can be broken down into predetermined ranges, for example by hour. Another exemplary input includes actual energy prices from each energy device. In some embodiments, the actual energy price can be broken down into predetermined ranges, for example by hour. Another exemplary input to the performance module 600 includes other metered data from each energy device. Exemplary metered data from each energy device includes, for example and not limitation, temperature, pressure, and the like.

An exemplary output of the performance module 600 includes a report. The output can be a plurality of reports. The report can be in many formats. In some embodiments, the report compares the budgeted operation from the budget module 100, the scheduled operation from the scheduling operation, and the actual operation of the energy devices or equipment. In some embodiments, the report can include a predetermined duration scheduled versus actual dispatch report to confirm the energy devices were dispatched as scheduled. For example, the predetermined duration for this report can be on a daily, weekly, monthly, or quarterly basis. While longer and shorter durations are possible, it may be preferable to sooner, rather than later, determine whether the energy devices are switching as desirable or instructed.

The performance module 600 can receive most, if not all of the data or outputs, from the budget and scheduling modules 100 and 400. In addition, the performance module 600 can receive actual metered hourly energy usage data from the energy devices, along with the hourly fuel costs, to map how the energy devices actually operated. This can determine what costs were actually incurred. In some embodiments, a weekly scheduled versus actual dispatch report to confirm equipment can be generated.

The performance module 600 can generate reports comparing budgeted, scheduled, and actual energy usage and costs. These reports can include variances to determine where operations can be improved. Comparing the actual to projected performance allows for the confirmation/optimization of equipment efficiencies and production energy needs. These reports can be customized for each specific user.

There are a number of examples of market/customer-side applications that may be managed by the EDMS 10. Some examples include but are not limited to natural gas or electric-fired process load/end-use; dual fuel and fuel switching process load/end-use; combined heat power (CHP)/cogeneration; chillers/thermal energy source; energy efficiency/demand management devices; demand response programs supporting system reserves/peaking capacity, renewables backup capacity, spinning/synchronous/balancing reserves; transmission and distribution grid congestion, balancing, and stabilization; distributed energy and distributed generation; renewables generation; renewable distributed energy (renewables with dispatchable storage); and other future green/sustainable market-side resource options.

The EDMS 10 has many benefits, including but not limited to productions and operations scheduling; operator performance monitoring; and budget monitoring and forecasting for, inter alia, energy variance, fuel cost variance, and unit fuel price variance (% change per month). In an exemplary embodiment, the EDMS 10 can provide for boiler fuel and/or energy system switching.

The planning could also be impacted by maintenance needs. The monitoring of the run, start, and stop times can facilitate this planning.

In an exemplary embodiment, the EDMS 10 can incorporate a control system to control the operation of the energy systems, for example to turn on/off each energy system at a desired time. The control system can be a switching system adapted to cause a desired energy system to be turned on or off. The control system can be an automatic switching system, whereby interpreting and receiving information from one of the budget, scheduling, or performance modules of the EDMS 10. The automatic switching system can automatically activate the energy system that is the least expensive to operate, while idling or deactivating other energy systems as appropriate, based on the decisions determined by the EDMS 10. That is, the EDMS 10 can drive and control the control system to activate and/or deactivate the energy systems. If not automatically driven, the control system can be manually controlled by a user to control the energy systems.

EXAMPLES

The following is a non-limiting example and is provided to illustrate modes of the presently disclosed subject matter. In light of the present disclosure and the general level of skill in the art, those of skill will appreciate that the following non-limiting example is intended to be exemplary only and that numerous changes, modifications, and alterations can be employed without departing from the scope of the presently disclosed subject matter.

Example 1

Industrial Boiler Example

Figure 11:
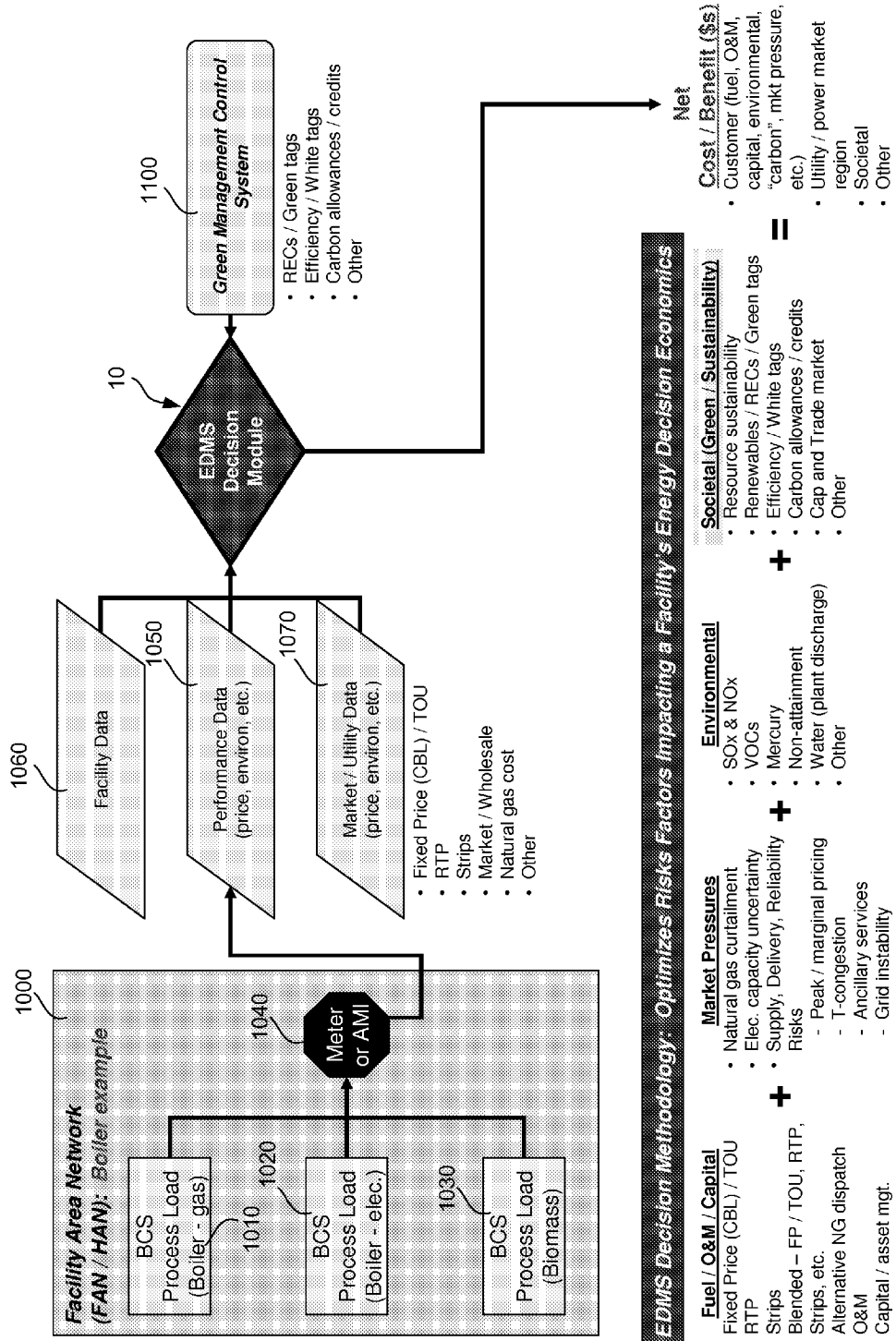
FIG. 11 displays a block diagram of an example of an energy decision management system for a facility, in accordance with an exemplary embodiment of the present invention.

FIG. 11 illustrates a block diagram of an energy decision management system for a facility. This example relates to an industrial boiler example.

As described, the EDMS 10 received a number of inputs. The block diagram of FIG. 11 illustrates some of the inputs to the EDMS 10.

FIG. 11 illustrates a facility area network (FAN) 1000, in a boiler example, that includes three energy sources: a gas boiler 1010, an electric boiler 1020, and a biomass device 1030. The three energy sources are fed to a meter 1040, for example an AMI (automatic meter instrument). Operation of the three energy sources can be controlled by the control system, which can be automatically or manually controllable.

After interpreted by the meter, which can read the status and/or usage of each of the energy systems, performance data 1050 is generated. This performance data 1050, which can include price, environmental conditions, and the like, can be one of many inputs to the EDMS 10. In addition, facility data 1060 and market/utility data 1070 can be fed to the EDMS 10. Examples of the market/utility data include fixed prices (commercial bill of landing)/transmission operating unit, RTP, strips, market/wholesale, natural gas cost, and the like. All of these inputs are provided to the EDMS 10, which operates as described above.

In addition, a green management control system 1100 can be fed to the EDMS 10. The green energy management system 1100 takes into consideration, among other things, renewable energy credits, green tags, efficiency, white tags, carbon allowances, carbon credits, and the like.

Ultimately, the EDMS 10 is configured to optimize risk factors impacting a facility's energy decision economics.

The fuel, operations & management (O&M), and capital is added to market pressures, which are added to environmental factors, which are summed with societal (i.e., green and sustainability) factors to result in a net cost or benefit.

For example and not limitation, the fuel, O&M, and capital can include: fixed process (commercial bill of landing)/transmission operating unit; RTP; strips; blended FP/TOU, RTP, and strips; alternative natural gas dispatch; operations and management fees; and capital/asset management.

For example and not limitation, the market pressures can include: natural gas curtailment; electric capacity uncertainty; and supply, delivery and reliability risks. The supply, delivery and reliability risks can include: peak/marginal pricing, T-congestion, ancillary services, and grid instability.

For example and not limitation, the environmental factors can include: SOx and NOx; VOCs; Mercury; non-attainment; water (plant discharge); and the like.

For example and not limitation, the societal factors can include: resource sustainability; renewables, RECs, and green tags; efficiency and white tags; carbon allowances and credits; and cap and trade markets.

For example and not limitation, the net cost/benefit of the EDMS 10 can include costs savings, including: customer costs, including fuel, O&M, capital, environmental, carbon, and market pressure costs, utility and power market region, and societal costs.

While exemplary embodiments of the invention have been disclosed many modifications, additions, and deletions can be made therein without departing from the spirit and scope of the invention and its equivalents, as set forth in the following claims.

What is claimed is:

1. An energy decision management system comprising a non-transitory computer-readable storage medium with an executable program stored thereon, wherein the program instructs a processor to perform steps, comprising:
   creating a strategic energy decision plan to operate a plurality of energy systems, the strategic energy decision plan including a derived 12-month energy usage based at least on a cost of fuel for each of the plurality of energy systems, energy costs, environmental credits and debits, usage forecasts of the plurality of energy systems, operating characteristics of each of the plurality of energy systems, and a cost of starting or stopping each of the plurality of energy systems;
   creating an operational schedule to determine which energy system of the plurality of energy systems to operate based on the strategic energy decision plan, the operating schedule including a derived 12-month operating schedule by hour of each of the plurality of energy systems; and
   producing management reports to quantify operational issues and accuracy based on the strategic energy decision plan and the operational schedule.

2. The energy decision management system of claim 1, wherein the steps performed by the processor comprises determining which energy system of the plurality of energy systems to operate to maximize cost savings.

3. The energy decision management system of claim 1, the energy decision management system retrofittable to existing energy management systems, distributed control systems, and distributed data control systems.

4. The energy decision management system of claim 1, wherein the energy decision management system is configured to receive data in real time and render decisions based on fuels, environmental impacts, and societal impacts.

5. The energy decision management system of claim 1, wherein creating a strategic energy decision plan to operate a plurality of energy systems comprises receiving a plurality of inputs and generating at least one output.

6. The energy decision management system of claim 5, wherein the steps performed by the processor further comprise receiving an energy profile, energy costs, plant operating characteristics, benchmarks, base load characteristics, plant usage, and historical plant usage as inputs.

7. The energy decision management system of claim 1, wherein the steps performed by the processor further comprise producing the operational schedule for manual or automated systems to monitor and maintain the operations of the energy systems.

8. The energy decision management system of claim 7, wherein creating an operational schedule to determine which energy system of the plurality of energy systems to operate based on predetermined criteria comprises receiving a plurality of inputs and generating at least one output.

9. The energy decision management system of claim 1, wherein producing management reports to quantify operational issues and accuracy comprises receiving a plurality of inputs and generates at least one output.

10. The energy decision management system of claim 9, wherein the steps performed by the processor further comprise coordinating outputs of the system for generation of an executive overview of actual energy usage versus budgeted energy usage.

11. A method of deciding which of a plurality of energy systems to operate in a plant, the method comprising:

creating a budget of energy characteristics of the plurality of energy systems, the budget including a derived 12-month energy usage based at least on a cost of fuel for each of the plurality of energy systems, energy costs, environmental credits and debits, usage forecasts of the plurality of energy systems, operating characteristics of each of the plurality of energy systems, and a cost of starting or stopping each of the plurality of energy systems;

producing a operating schedule for the plurality of energy systems over a duration based in part on the budget of energy characteristics, the operating schedule including a derived 12-month operating schedule by hour of each of the plurality of energy systems;

operating the plurality of energy systems based on the operating schedule; and generating a report of actual energy usage versus budgeted energy usage based in part on the budget of energy characteristics of the plurality of energy systems and the operating schedule for the plurality of energy systems.

12. The method of claim 11, further comprising controlling the operation of the plurality of energy systems with an automatic switching system.

* * * * *